United States Patent

[11] 3,589,643

| [72] | Inventor | Tatuo Takizawa<br>Tokyo, Japan |
|---|---|---|
| [21] | Appl. No. | 820,898 |
| [22] | Filed | May 1, 1969 |
| [45] | Patented | June 29, 1971 |
| [73] | Assignee | Olympus Optical Co., Ltd.,<br>Tokyo, Japan |

[54] METHOD FOR WINDING A FIBER OPTICAL ELEMENT AND DEVICE THEREFOR
4 Claims, 4 Drawing Figs.

[52] U.S. Cl. .................................................. 242/158.2,
74/58
[51] Int. Cl. .................................................. B65h 57/28
[50] Field of Search........................................... 242/7.21,
7.22, 158.2—158.6, 9; 28/37; 74/55—59

[56] References Cited
UNITED STATES PATENTS

| 2,972,796 | 2/1961 | Block .......................... | 28/37 |
| 3,031,153 | 4/1962 | Attwood et al. .............. | 242/158 |
| 3,039,707 | 6/1962 | Beck et al. .................... | 242/9 |

Primary Examiner—Leonard D. Christian
Attorney—Kurt Kelman

ABSTRACT: Method and device for winding at least one thin elongated fiber optical element onto a rotating drum so as to form a closely wound coil of the fiber optical element in making a fiber optical system from the coil. The fiber optical element is fed to the drum from a direction in retard of the displacement of the point on the drum at which the fiber optical element successively contacts the drum so as to be wound thereon as the drum rotates, thus permitting the fiber optical element windings to be wound on the drum in close contact with each other. An elastic roller is provided in elastically pressing contact with the drum along the entire portion on the drum where the fiber optical element contacts the drum as the same is rotated, thus positively preventing adjacent windings of the fiber optical element to overlap while permitting the adjacent windings on the drum to be kept in close contact with each other.

PATENTED JUN 29 1971 3,589,643
INVENTOR
TATUO TAKIZAWA
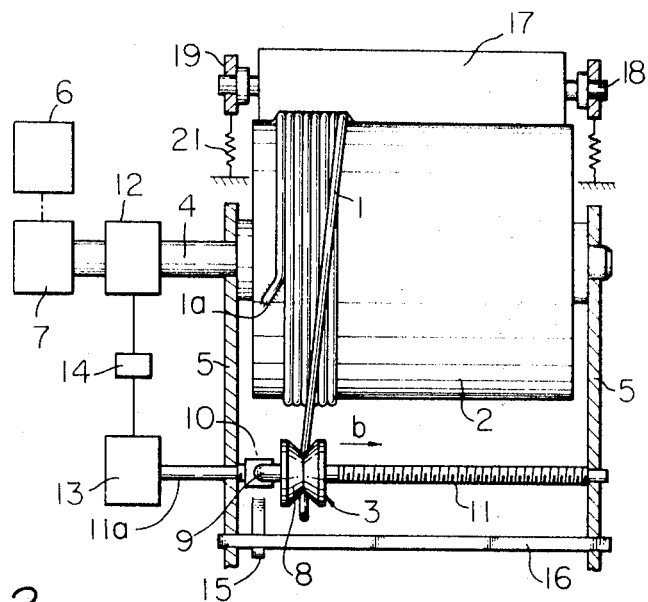
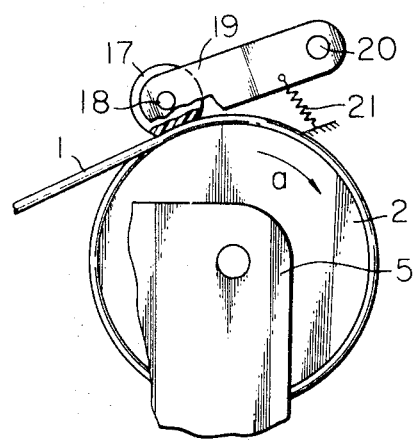
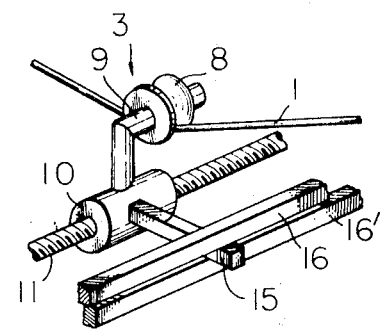
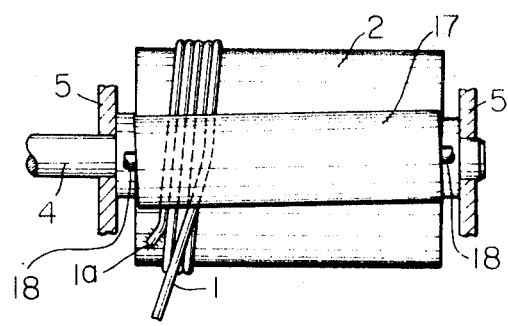

METHOD FOR WINDING A FIBER OPTICAL ELEMENT AND DEVICE THEREFOR

BACKGROUND OF THE INVENTION

The present invention relates to a method for winding at least one thin elongated fiber optical element onto a rotating drum so as to form a coil of the fiber optical element in making a fiber optical system therefrom with the adjacent windings of the coil arranged in close contact with each other, and to a device for carrying out the above-described method.

A fiber optical system has been used for transmitting an optical image or an optical signal given at one end surface of the system therethrough to the other end surface.

In winding the fiber optical element onto the rotating drum, care must be taken to prevent a clearance from being formed between adjacent windings of the coil of the fiber optical element in order to form a closely wound coil of the fiber optical element. To this end, the guide member for supplying the fiber optical element onto the drum must be moved substantially in parallel to the axis of the drum precisely at the same speed as that of the displacement of the point at which the fiber optical element contacts the drum as the same is being wound therearound so that the fiber optical element is fed to the drum at a right angle with respect to the axis of the rotating drum, that is, the guide member must be moved by an amount corresponding to the diameter of the fiber optical element as the drum is rotated by one revolution.

In case the movement of the guide member is irregular or inaccurate with respect to the rotational speed of the drum, a clearance might be formed between adjacent windings of the coil of the fiber optical elements formed on the drum or the fiber optical element might be wound on the adjacent previously formed winding of the coil in overlapping relation with each other. This is a fatal defect in making a fiber optical system.

In order to avoid the above-described disadvantages, very expensive equipment has been required for precisely moving the guide member or a very troublesome adjustment of the equipment has been required for accurately operating the same.

SUMMARY OF THE INVENTION

An object of the present invention is to avoid the above-described disadvantages of the prior art and to provide a novel and useful method for winding the fiber optical element onto a drum in making a fiber optical system wherein no expensive equipment having high accuracy is required for guiding the fiber optical element in order to form a coil of the fiber optical element with adjacent windings of the coil arranged in close contact with each other.

The other object of the present invention is to provide a novel and useful device for carrying out the above-described method which is simple in construction and inexpensive in manufacture and easy to operate.

The above objects are achieved by a method in accordance with the present invention for winding at least one thin elongated fiber optical element onto a rotating drum so as to form a coil of the fiber optical element with adjacent windings of the coil arranged closely adjacent to each other in making a fiber optical system from the coil, the method being characterized by supplying the fiber optical element onto the drum from a direction in retard of the point at which the fiber optical element successively contacts the drum thereby permitting the fiber optical element to be wound around the drum in close contact with the adjacent previously formed winding of the coil by virtue of the sliding movement of the fiber optical element on the adjacent previously formed winding into position on the drum as the same is being wound around the drum The fiber optical element is elastically pressed against the drum at the point at which the same is commenced to be wound onto the drum thereby permitting each fiber optical element winding to be located in close contact with the adjacent previously formed winding while the fiber optical element is positively prevented from being wound onto the adjacent previously formed winding in overlapping relation with each other.

In accordance with the present invention, a device is provided for winding at least one thin elongated fiber optical element onto a rotating drum so as to form a coil of the fiber optical element with adjacent windings of the coil arranged closely adjacent to each other in making a fiber optical system from the coil, the device being characterized by the provision of guide means for supplying the fiber optical element onto the drum which is stationarily or movably located at a position from which the fiber optical element is supplied to the drum in retard of of the point at which the fiber optical element successively contacts the drum thereby permitting the fiber optical element to be wound around the drum in close contact with the adjacent previously formed winding of the coil by virtue of the sliding movement of the fiber optical element on the adjacent previously formed winding into position on the drum as the same is being wound around the drum. The device comprises a freely rotatable elastic roller arranged in elastically pressing contact with the drum substantially the entire length thereof.

In accordance with a further feature of the present invention, the axis of the elastic roller may be slightly inclined with respect to that of the drum so as to give the tendency of positively urging the fiber optical element which is being contacted with the drum toward the adjacent previously formed winding of the coil by virtue of the rotation of the elastic roller about the inclined axis thereof.

In case the guide means is located relatively remote from the drum and the axial length of the coil to be formed by the fiber optical element is relatively small, the guide means may be located stationarily, because the variation in the angle formed between the fiber optical element supplied to the drum and the axis of the drum is not so great when the winding of the fiber optical element proceeds to affect the effectiveness of the method of the present invention.

In case, however, the length of the coil formed by the winding of the fiber optical element is relatively great, it is preferred to move the guide means in the direction parallel to the axis of the drum and toward the displacement of the point at which the fiber optical element contacts the drum so as to maintain the angle formed between the fiber optical element and the axis of the drum unchanged.

BRIEF DESCRIPTION OF THE DRAWINGS

FIG. 1 is a view partly in cross section showing an embodiment of the device of the present invention;

FIG. 2 is a side view of FIG. 1;

FIG. 3 is a partial perspective view showing an embodiment of the guide means for supplying the fiber optical system to the rotating drum; and FIG. 4 is a view schematically showing a modification of the device of FIG. 1 in which the axis of the elastic roller is inclined with respect to that of the rotating drum.

DETAILED DESCRIPTION OF THE PREFERRED EMBODIMENTS

Referring to FIGS. 1 and 2, a fiber optical element 1 is supplied from a supply (not shown) to a rotating drum 2 through guide means 3 so as to be wound on the peripheral surface of the drum 1 with adjacent windings of the fiber optical element 1 in close contact with each other. As shown, the forward end 1a, of the fiber optical element 1 is secured to the peripheral surface of the drum 2 adjacent to one end thereof by means such as a bonding agent.

The rotating drum 2 is fixedly supported on a driving shaft 4 which is journaled in the bearings provided in the supporting plates 5 located at the respective ends of the drum 2. Driving motor 6 drives the shaft 4 and hence the drum 2 through a reduction gear 7 in the direction indicated by the arrow a in FIG. 2.

The guide means 3 comprises a grooved roller 8 for guiding the fiber optical element 1 rotatably journaled on a shaft 9 secured to a feeding member 10 provided with a female thread therein which threadedly engage with a feeding screw 11 rotatably supported in the supporting plates 5,5 as shown in FIGS. 1 to 3.

As shown in FIG. 1, an extension 11a, of the feeding screw 11 is operatively coupled with the driving shaft 4 through gearing means 12, 13 and a clutch 14 interposed therebetween so as to drive the guide means 3 in the direction indicated by b in FIG. 1 as the drum 2 is rotated by the motor 6.

In order to prevent the guide means 3 from being rotated with the feeding screw 11, a pin 15 protrudes from the feeding member 10 and a pair of parallel rails 16,16' are secured to the supporting plates 5,5' parallel to the feeding screw 11 as shown in FIGS. 1 and 3. The rails 16,16' are parallelly spaced from each other so that the pin 15 slidably fits in the clearance formed between the two rails 16,16'. Thus, the feeding member 10 is fed along the feeding screw 11 as the same is rotated by virtue of the fact that the feeding member 10 is prevented from rotating together with the feeding screw by the sliding engagement of the pin 15 with the clearance between the two parallel rails 16, 16' located in parallel to the feeding screw 11. The rotational speed of the feeding screw 11 relative to that of the drum 2 is so set means of the gearing means 12, 13 that the guide means 3 is fed along the feeding screw 11 by an amount corresponding to the diameter of the fiber optical element 1 to be wound on the drum 2 as the same is rotated by one revolution.

The guide means 3 for guiding the fiber optical element 1 from the supply thereof to the drum 2 is located on the feeding screw 11 in retard of the point on the feeding screw 11 corresponding to the point on the drum at which the fiber optical element 1 contacts the drum 2 to be wound thereon as the winding of the fiber optical element 1 onto the drum 2 proceeds and, hence, the feeding means 3 is moved along the feeding screw 11 as shown in FIG. 1. Thus, the fiber optical element 1 positively contacts the adjacent previously wound winding of the fiber optical element 1 on the drum 2 and slides on the adjacent previously wound winding into position on the drum 2 as the fiber optical element 1 is being wound on the drum 2, thereby positively preventing any clearance from being formed between adjacent windings of the fiber optical element 1 on the drum 2.

A rotatable elastic roller 17 is provided so as to positively locate the fiber optical element 1 on the drum 2 in close contact with the adjacent previously wound winding of the fiber optical element 1 on the drum 2 as the same is being wound on the drum 2. As shown in FIGS. 1 and 2, the elastic roller 17 is supported on a shaft 18 which is in turn rotatably journaled in the bearings provided in the free ends of a pair of swingable levers 19 pivoted at 20.

A spring 21 is secured at its on end to the intermediate portion each of the levers 19 and the other end is secured to a stationary point (not shown) in the device so that the elastic roller 17 is urged against the drum 2 along the entire length at which the fiber optical element 1 is wound on the drum 2 as the same is rotated.

The rotatable elastic roller 17 serves to elastically press the portion of the fiber optical element 1 which is contacted with the adjacent previously wound winding of the fiber optical element 1 contacting the adjacent fiber optical element 1 contacting the adjacent previously wound winding is positively guided into position on the drum 2 in close contact with the adjacent previously wound winding by sliding thereon, while the fiber optical element 1 is positively prevented from being wound on the adjacent previously wound winding of the fiber optical element 1 in overlapping relation thereto.

In accordance with another feature of the present invention, the axis of the elastic drum 17 is inclined slightly with respect to the axis of the drum 2 as shown in FIG. 4 in contrast to the embodiment of FIG. 1 in which the axis of the elastic roller 17 is positioned in parallel to the axis of the drum 2 when the roller 17 contacts the drum 2.

In the embodiment shown in FIG. 4, the axis of the roller 17 is slightly inclined with respect the axis of the drum 2 in such a manner that the fiber optical element 1 supplied to, and contacting, the drum 2 is urged toward the adjacent previously wound winding of the fiber optical element 1 by the component of the rotational movement of the peripheral surface of the elastic roller 17 contacting the drum 2 in the axial direction of the drum 2. Thus, the fiber optical element 1 is positively positioned on the drum 2 in close contact with the adjacent previously wound winding of the fiber optical element 1 on the drum 2.

In case the length of the coil of the fiber optical element 1 to be wound on the drum 2 is relatively small and the distance between the guide means 3 and the drum 2 is made relatively large, the guide 3 may be kept stationary without moving it along the direction of the axis of the drum 2, as previously described.

In operation, it is merely necessary to feed the fiber optical element 1 through the guide means 3 and manually wind it by a few turns on the drum 2 with the forward end of the fiber optical element 1a, being secured to the peripheral surface of the drum 2 by means such as a bonding agent. The guide means 3 may then be located at an appropriate position by driving the feeding screw 11 independently from the shaft 4 by disengaging the clutch 14. Then, the device is operated by the motor 6 after the clutch 6 is again engaged. The winding operation of the fiber optical element 1 is evident from the above description.

It should be understood that the embodiments shown and described above are only illustrative and it is to be understood that the present invention should be defined only by the appended claims.

I claim:

1. Method for winding a coil of closely adjacent windings of an elongated element on a rotating drum by supplying the element to the drum from a direction in retard of the points at which the element successively contacts the rotating drum comprising the step of elastically pressing the first and all successive windings of the element onto the drum along substantially the entire length thereof.

2. The method of claim 1 wherein each successive winding is guided towards and elastically pressed against a preceding one of the windings.

3. Apparatus for winding a coil of closely adjacent windings of an elongated element, which comprises a rotating drum whereon the coil is wound, a guide means for supplying the elongated element to the drum, the guide means being positioned in retard of the points at which the element successively contacts the rotating drum, and a freely rotatable elastic roller arranged in elastically pressing contact with the drum along substantially the entire length thereof for pressing the first and all successive windings of the element onto the drum.

4. Device according to claim 3, wherein the axis of said elastic roller is slightly inclined with respect to that of said drum so as to give the tendency of positively urging said element which is being contacted with said drum toward the adjacent previously formed winding of said coil by virtue of the rotation of said elastic roller about said inclined axis thereof.

PO-1050
(5/69)

UNITED STATES PATENT OFFICE
CERTIFICATE OF CORRECTION

Patent No. 3,589,643          Dated   June 29, 1971

Inventor(s)    Tatuo Takizawa

It is certified that error appears in the above-identified patent and that said Letters Patent are hereby corrected as shown below:

On the title page, between items "73" and "54" insert:--
    (32) Priority     May 8, 1968
    (33)               Japan
    (31)               30,668/1968

Signed and sealed this 9th day of November 1971.

(SEAL)
Attest:

EDWARD M. FLETCHER, JR.          ROBERT GOTTSCHALK
Attesting Officer                  Acting Commissioner of Patents